United States Patent
Magrath et al.

(10) Patent No.: US 10,146,262 B1
(45) Date of Patent: Dec. 4, 2018

(54) APPARATUS, SYSTEMS, AND METHODS FOR DETATCHABLE HEAD-MOUNTED-DISPLAY STRAP INTERFACES

(71) Applicant: Oculus, VR, LLC, Menlo Park, CA (US)

(72) Inventors: Lesley Ribble Magrath, Seattle, WA (US); Paul Bongkyu Koh, New York, NY (US)

(73) Assignee: Oculus, VR, LLC, Menlo Park, CA (US)

( * ) Notice: Subject to any disclaimer, the term of this patent is extended or adjusted under 35 U.S.C. 154(b) by 33 days.

(21) Appl. No.: 15/581,804

(22) Filed: Apr. 28, 2017

(51) Int. Cl.
*G06F 1/16* (2006.01)

(52) U.S. Cl.
CPC ............ *G06F 1/1654* (2013.01); *G06F 1/163* (2013.01)

(58) Field of Classification Search
CPC .. A44B 17/007; A44B 17/0076; F16M 13/04; G06F 3/16; H04R 1/028; H04R 1/1066; H04R 2499/15
See application file for complete search history.

(56) References Cited

U.S. PATENT DOCUMENTS

| | | | | |
|---|---|---|---|---|
| 2008/0144854 A1* | 6/2008 | Abreu | ..................... | G02C 3/003 381/74 |
| 2012/0033142 A1* | 2/2012 | Thomson | ............... | G02B 7/002 348/838 |

\* cited by examiner

*Primary Examiner* — Nelson Rosario
(74) *Attorney, Agent, or Firm* — FisherBroyles, LLP (57) ABSTRACT

A detachable head-mounted-display strap-interface apparatus may include (1) a strap that includes an electrical accessory that necessitates an electrical connection to a head-mounted display and (2) a mount coupled to the strap that includes (a) an interface that is mateable and demateable to an opposing interface of the head-mounted display, (b) an electrical connector that is configured to provide the electrical connection from the electrical accessory to the head-mounted display when contacting an opposing electrical connector of the head-mounted display, and (c) a latch that couples, in a first orientation, the interface and the opposing interface of the head-mounted display and enables, in a second orientation, the interface to be decoupled from the opposing interface of the head-mounted display and the electrical connector to be disconnected from the opposing electrical connector. Various other detachable head-mounted-display strap-interface apparatus, devices, systems, and methods are also disclosed.

20 Claims, 9 Drawing Sheets

APPARATUS, SYSTEMS, AND METHODS FOR DETATCHABLE HEAD-MOUNTED-DISPLAY STRAP INTERFACES

BACKGROUND

Virtual-reality head-mounted displays have wide applications in various fields, including engineering, design, medical surgery practice, military simulated practice, and video gaming. For example, virtual-reality head-mounted displays may allow users to experience realistic, immersive virtual environments while playing video games, during flight-simulation training, or when interacting with co-workers around the globe.

A conventional head-mounted display may include a strap system that holds the head-mounted display on a user's head and against the user's face. Unfortunately, the straps or other components of a conventional strap system may become worn and dirty over time, which may necessitate removal and replacement of the straps. Additionally, conventional head-mounted displays are often shipped with generic one-size-fits-all strap systems that may not suit every user. For example, generic one-size-fits-all strap systems may not fit all users equally well and may not suit the stylistic tastes of many users, especially users that have a more individualized fashion sense. For at least these reasons, many users may want or need to remove and replace the generic one-size-fits-all strap systems that come with conventional head-mounted displays.

SUMMARY

As will be described in greater detail below, the instant disclosure generally relates to detachable head-mounted-display strap interfaces, devices, systems, and methods. In some embodiments, a detachable head-mounted-display strap-interface apparatus may include (1) a strap that includes an electrical accessory that necessitates an electrical connection to a head-mounted display and (2) a mount coupled to the strap that includes (a) an interface that is mateable and demateable to an opposing interface of the head-mounted display, (b) an electrical connector that is configured to provide the electrical connection from the electrical accessory to the head-mounted display when contacting an opposing electrical connector of the head-mounted display, and (c) a latch that couples, in a first orientation, the interface and the opposing interface of the head-mounted display and enables, in a second orientation, the interface to be decoupled from the opposing interface of the head-mounted display and the electrical connector to be disconnected from the opposing electrical connector. The latch may couple, in the first orientation, the interface and the opposing interface of the head-mounted display such that the electrical connector and the opposing electrical connector maintain contact and the strap holds the head-mounted display against a user's face.

In some embodiments, the opposing interface of the head-mounted display may include a mateable and demateable plug, the interface may include a receptacle that is configured to receive the plug of the head-mounted display, and the latch may be configured to (1) retain, in the first orientation, the plug of the head-mounted display in the receptacle and (2) enable, in the second orientation, the plug of the head-mounted display to be decoupled from the receptacle and the electrical connector to be disconnected from the opposing electrical connector. In some examples, the receptacle may include a planar base, and the electrical connector may be integral to the planar base. In at least one example, the electrical connector may be further recessed into the planar base.

In some embodiments, the mount may include four additional electrical connectors that are configured to provide additional electrical connections to the head-mounted display when contacting four additional opposing electrical connectors of the head-mounted display. In some embodiments, the opposing electrical connector may include a spring connector, and the electrical connector may include a contact pad configured to blind-mate (i.e., self align) to the spring connector. In some examples, the electrical connector may be configured to carry electrical power, an audio signal, a video signal, a sensor signal, or a control signal, and the electrical accessory may include a motion-tracking accessory (e.g., a light-emitting motion-tracking accessory), an audio accessory, or a cable.

According to various embodiments, a corresponding head-mounted-display strap-interface apparatus may include a head-mounted display and a mount coupled to the head-mounted display. The mount may include (1) an interface that is mateable and demateable to an opposing interface of a strap that includes an electrical accessory that necessitates an electrical connection to the head-mounted display, (2) an electrical connector that is configured to provide the electrical connection from the electrical accessory to the head-mounted display when contacting an opposing electrical connector of the strap, and (3) a latch that couples, in a first orientation, the interface and the opposing interface of the strap and enables, in a second orientation, the interface to be decoupled from the opposing interface of the strap and the electrical connector to be disconnected from the opposing electrical connector. In some examples, the latch may couple, in the first orientation, the interface and the opposing interface of the strap such that (1) the electrical connector and the opposing electrical connector maintain contact and (2) the strap holds the head-mounted display against a user's face.

In some embodiments, the opposing interface of the strap may include a mateable and demateable plug, the interface may include a receptacle that is configured to receive the plug of the strap, and the latch may be configured to retain, in the first orientation, the plug of the strap in the receptacle and enable, in the second orientation, the plug of the strap to be decoupled from the receptacle.

According to various embodiments, a corresponding head-mounted-display system may include (1) a head-mounted display, (2) a strap that includes an electrical accessory that necessitates an electrical connection to the head-mounted display, (3) a mount coupled to the head-mounted display, and (4) an opposing mount coupled to the strap. In some embodiments, the mount coupled to the head-mounted display may include (1) an interface that is mateable and demateable to an opposing interface of the strap and (2) an electrical connector that is configured to provide the electrical connection from the electrical accessory to the head-mounted display when contacting an opposing electrical connector of the strap. Additionally, the opposing mount coupled to the strap may include (1) the opposing interface that is mateable and demateable to the interface of the head-mounted display, (2) the opposing electrical connector that is configured to provide the electrical connection from the electrical accessory to the head-mounted display when contacting the electrical connector of the head-mounted display, and (3) a latch that couples, in a first orientation, the interface and the opposing interface and enables, in a second orientation, the interface to be decoupled from the opposing interface and the electrical connector to be disconnected from the opposing electrical connector. In some examples, the latch may couple, in the first orientation, the interface and the opposing interface such that (1) the electrical connector and the opposing electrical connector maintain contact and (2) the strap holds the head-mounted display against a user's face.

In some embodiments, the interface of the head-mounted display may include a mateable and demateable plug, the opposing interface of the strap may include a receptacle that is configured to receive the plug of the head-mounted display, and the latch may be configured to retain, in the first orientation, the plug of the head-mounted display in the receptacle of the strap and enable, in the second orientation, the plug of the head-mounted display to be decoupled from the receptacle of the strap.

In some embodiments, the receptacle may include a planar base that is recessed into the opposing mount, and the opposing electrical connector may be integral to the planar base. in at least one embodiment, the opposing electrical connector may be further recessed into the planar base.

In some embodiments, the mount may include four additional electrical connectors that are configured to provide additional electrical connections to the head-mounted display when contacting four additional opposing electrical connectors of the strap, and the opposing mount may include the four additional opposing electrical connectors. In at least one embodiment, the electrical connector may include a spring connector, and the opposing electrical connector may include a contact pad configured to blind-mate to the spring connector.

In some embodiments, the electrical connector and the opposing electrical connector may be configured to carry electrical power, an audio signal, a video signal, a sensor signal, or a control signal, and the electrical accessory may include a motion-tracking accessory (e.g., a light-emitting motion-tracking accessory), an audio accessory, or a cable.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate examples of apparatuses, systems, and methods according to various embodiments described herein. These drawings are a part of the specification and, together with the following description, demonstrate and explain various principles of the instant disclosure. Throughout the drawings, identical reference characters and descriptions indicate similar, but not necessarily identical, elements.

While the exemplary embodiments described herein are susceptible to various modifications and alternative forms, specific embodiments have been shown by way of example in the drawings and will be described in detail herein. However, the elements, configurations, and steps shown in the drawings are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The disclosure provided herein describes and illustrates numerous exemplary strap-mount interfaces for detachably coupling a strap system that includes one or more electrical accessories (e.g., lights, power cables, video cables, headphones, etc.) to a head-mounted display to which the electrical accessories may need to be electrically connected. These strap-mount interfaces may incorporate electrical connectors that may provide electrical connections from the electronic accessories of the head-mounted-display strap system to the head-mounted display. The head-mounted-display systems disclosed herein with detachable strap systems may provide various features and advantages over conventional head-mounted-display systems by enabling a strap system, especially a strap system with integrated electrical accessories, to be easily attached to and removed from a head-mounted display. In this way, users of the head-mounted-display systems disclosed herein may replace dirty or worn straps systems and/or swap out generic strap systems with strap systems that better suit their needs.

Figure 1:
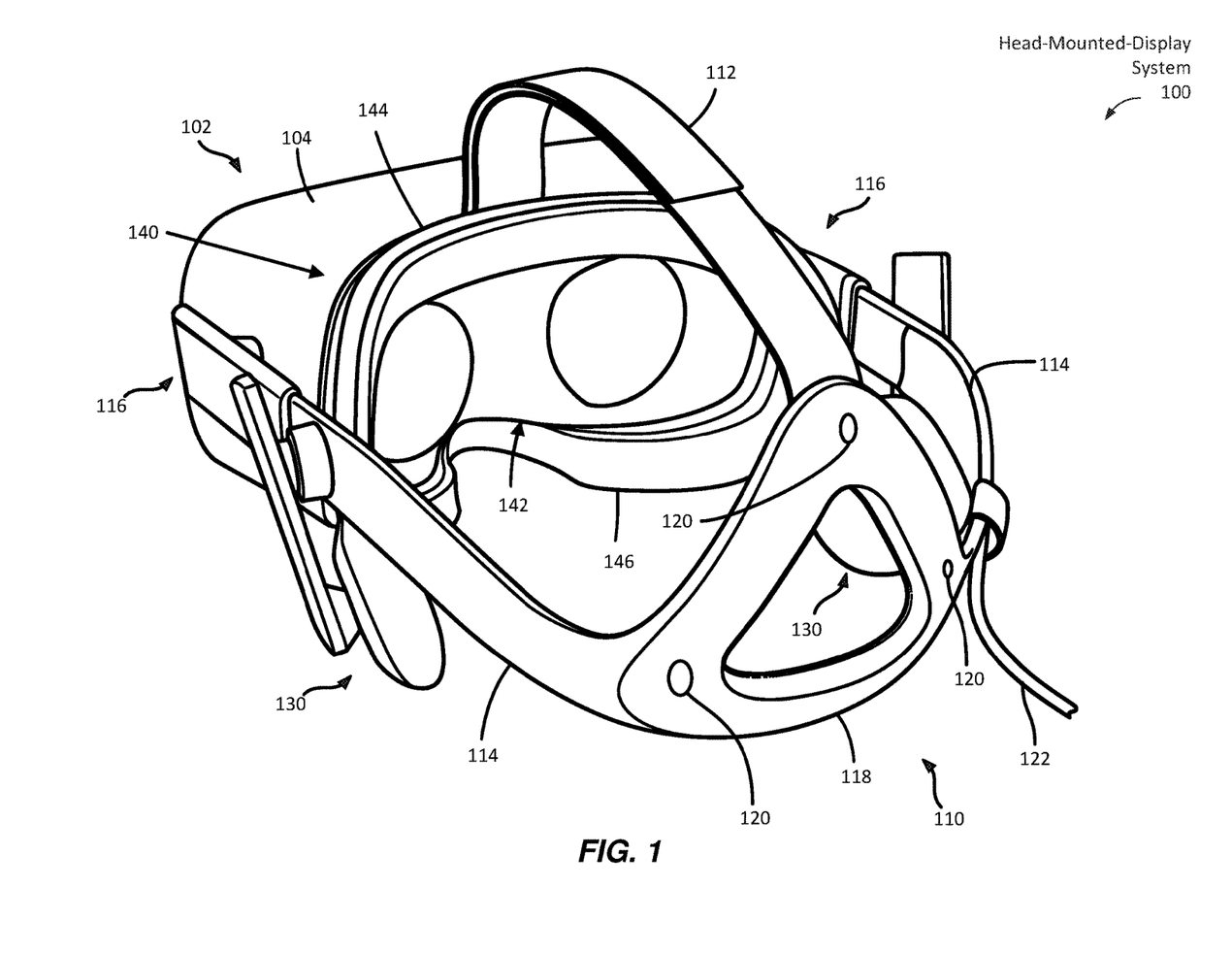
FIG. 1 is a perspective view of an exemplary head-mounted-display system with a detachable strap system in accordance with some embodiments.
Figure 3A:
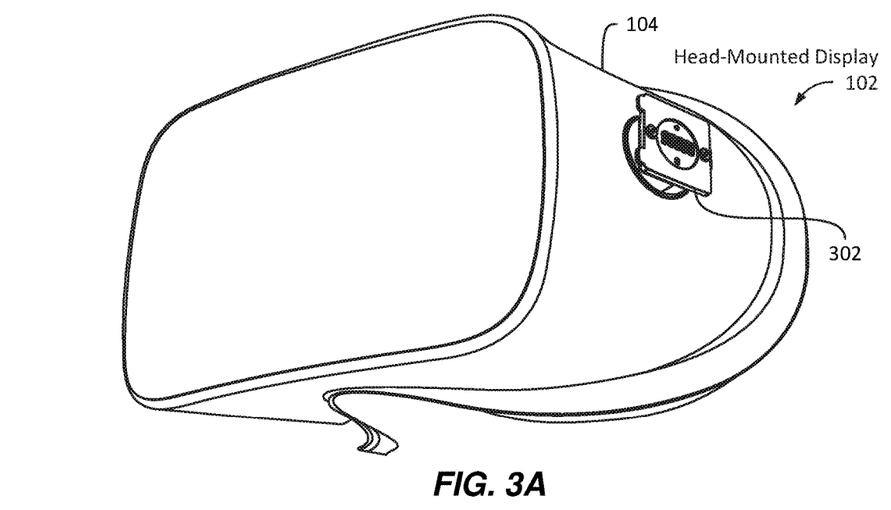
FIG. 3A is a perspective view of an exemplary head-mounted display with an interface.
Figure 4A:
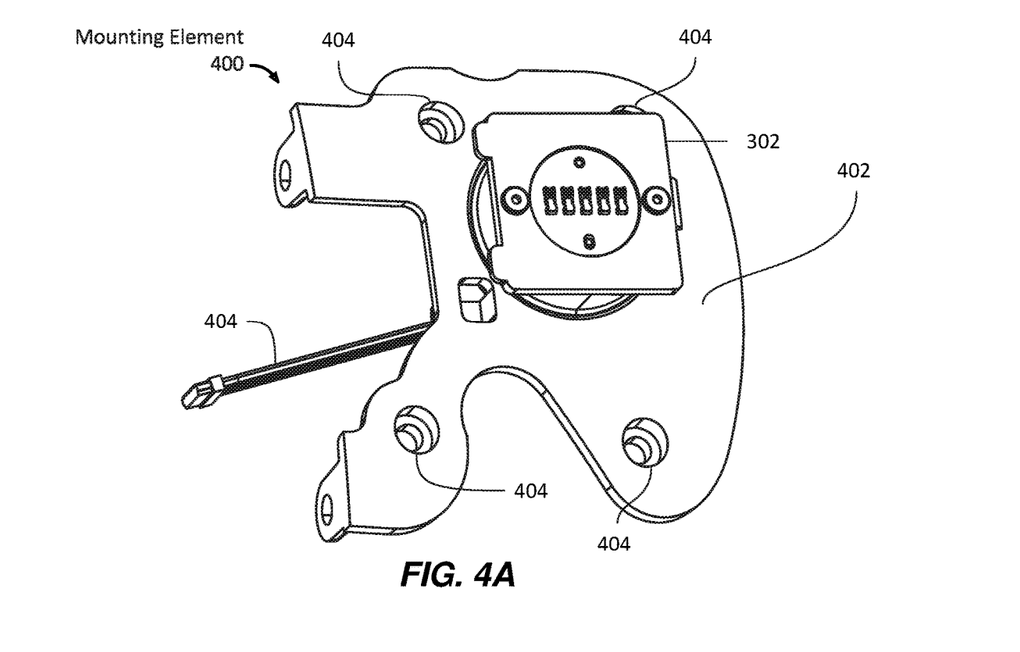
FIG. 4A is a perspective view of an exemplary mounting element with an interface.
Figure 4B:
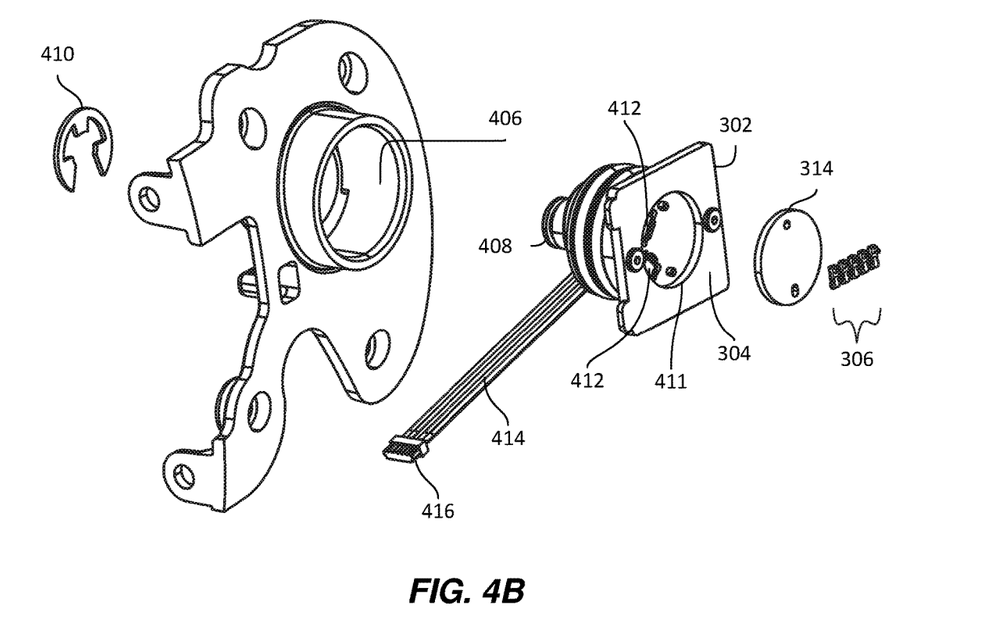
FIG. 4B is an exploded view of the mounting element illustrated in FIG. 4A.
Figure 5:
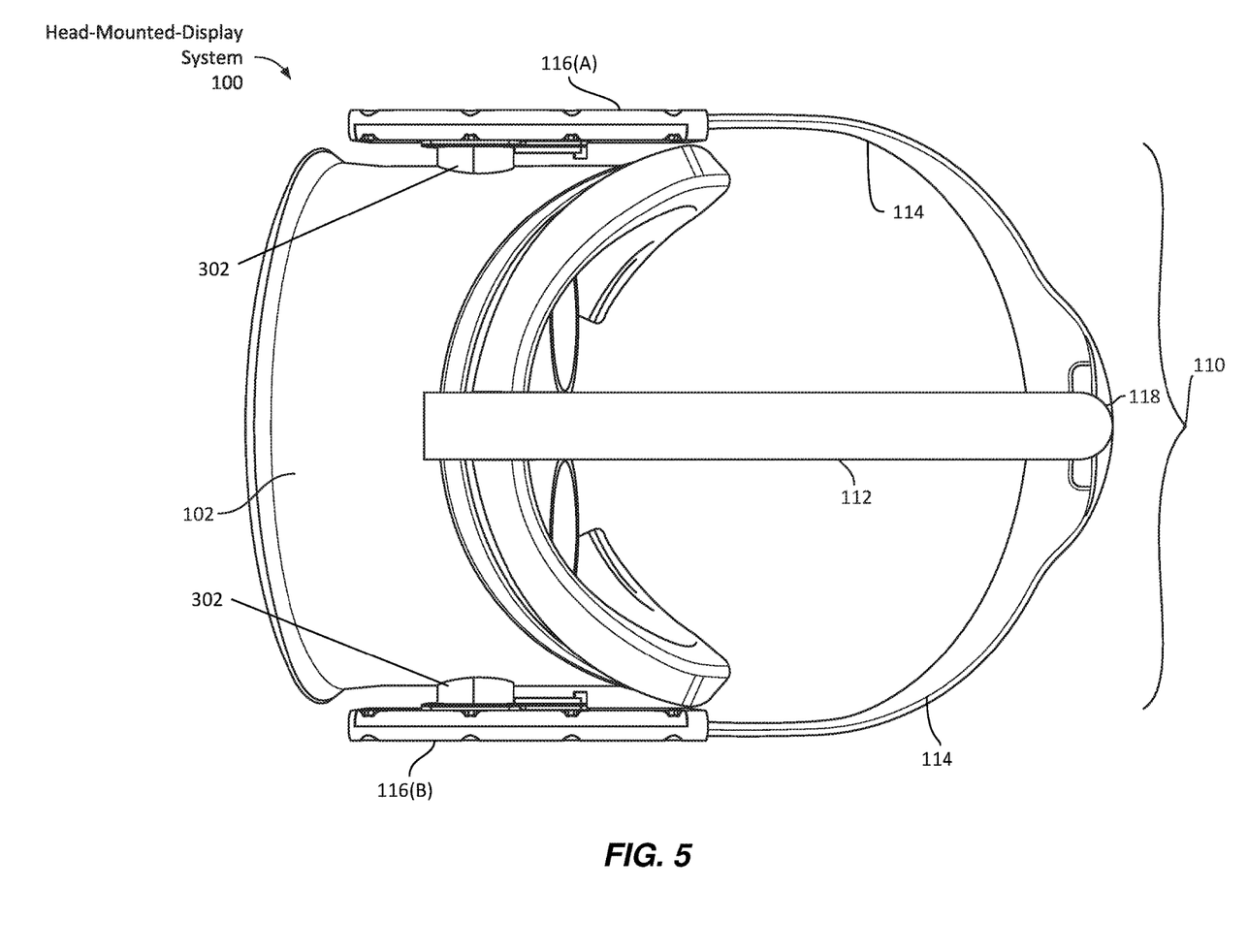
FIG. 5 is a top view of an exemplary head-mounted-display system with an attached strap system.
Figure 6:
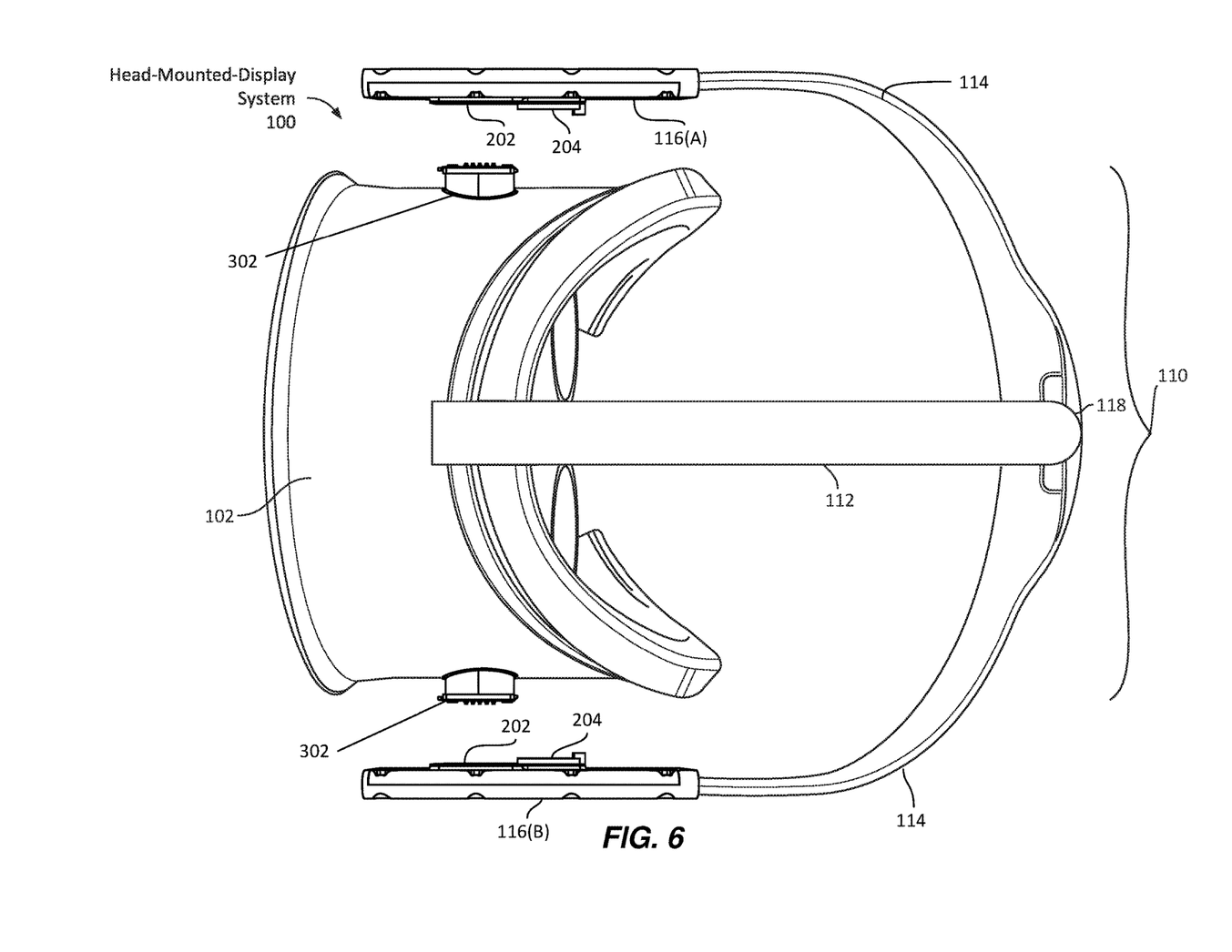
FIG. 6 is a top view of an exemplary head-mounted-display system with a detached strap system.

The following will provide, with reference to FIGS. 1, 5, and 6, examples of head-mounted-display systems with detachable strap systems. In addition, the discussions associated with FIGS. 2A-4B, 7A-7C, 9A, and 9B will provide examples of head-mounted-display strap-interface apparatus that enable the detachability of the strap systems illustrated in FIGS. 1, 5, and 6. Finally, the discussion corresponding to FIG. 8 will provide examples of methods for manufacturing, assembling, configuring, and/or using the head-mounted-display systems presented herein.

FIG. 1 is a perspective view of a head-mounted-display system 100 with a detachable strap system 110 in accordance with some embodiments. Head-mounted-display system 100 includes a head-mounted display 102 coupled to detachable strap system 110. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Examples of head-mounted displays may include OCULUS RIFT, GOOGLE GLASS, VIVE, SAMSUNG GEAR, etc.

In some embodiments, head-mounted display 102 may include an outer housing 104 that may surround, contain, and protect various display, optical, and other electronic components of head-mounted display 102. As will be explained in greater detail below, outer housing 104 may include integrated interfaces (e.g., interface 302 in FIG. 3) for attaching detachable strap system 110. Head-mounted display 102 may also include a facial-interface subsystem 140. Facial-interface subsystem 140 may be configured to comfortably rest against a region of a user's face, including a region surrounding the user's eyes, when head-mounted-display system 100 is worn by the user. In these embodiments, facial-interface subsystem 140 may include a facial-interface cushion 146 that is coupled to a facial-interface mounting member 144. Facial-interface cushion 146 and facial-interface mounting member 144 may surround a viewing region 142 that includes the user's field of vision while the user is wearing head-mounted-display system 100.

In some embodiments, detachable strap system 110 may be used to mount head-mounted display 102 on a user's head. As shown in FIG. 1, detachable strap system 110 may include an upper strap 112 and lower straps 114. Lower straps 114 may each be coupled to one of detachable strap-interface mounts 116, which are shown coupled to head-mounted display 102. Detachable strap system 110 may adjustably conform to the top and/or sides of a user's head when the user is wearing head-mounted display 102. In some embodiments, detachable strap system 110 may include a back piece 118 coupled with upper strap 112 and lower straps 114 to rest against the back of the user's head (e.g., around the user's occipital lobe).

Detachable strap system 110 may include various electrical accessories that may require an electrical connection to head-mounted display 102. As used herein, the term "electrical accessory" generally refers to any electrical component that may need or require, for proper operation, a connection to electrical power and/or a physical electrical pathway to the electrical components of a head-mounted display. Examples of electrical accessories may include, without limitation, sensors, output devices (e.g., lights, display devices, audio devices, haptic devices, etc.), wireless communication devices (e.g., antennae), and electrical signal or power transfer mediums (e.g., wires or cables). As shown in FIG. 1, detachable strap system 110 may include motion-tracking lights 120 integrated into back piece 118, a cable 122 integrated into one of lower straps 114, and audio subsystems 130 coupled to lower straps 114. While not illustrated in FIG. 1, each of motion-tracking lights 120, cable 122, and audio subsystems 130 may be connected, via a physical electrical pathway (e.g., a wire or cable), to electrical connectors (e.g., electrical contact pads 206 illustrated in FIG. 2B) contained in one or both of detachable strap-interface mounts 116.

In some embodiments, motion-tracking lights 120 may be light-emitting-diode markers that are used by an external motion-tracking system to track the position and/or motion of head-mounted-display system 100. In some embodiments, cable 122 may carry power to head-mounted display 102 and/or various electrical signals (e.g., video signals, audio signals, control signals, and/or sensor signals) from or to an external computing system. In some embodiments, audio subsystems 130 may provide audio signals to a user's ears. As shown, head-mounted-display system 100 may have two audio subsystems 130 located on the left and right sides of head-mounted-display system 100 to provide audio signals to the user's left and right ears.

Figure 2A:
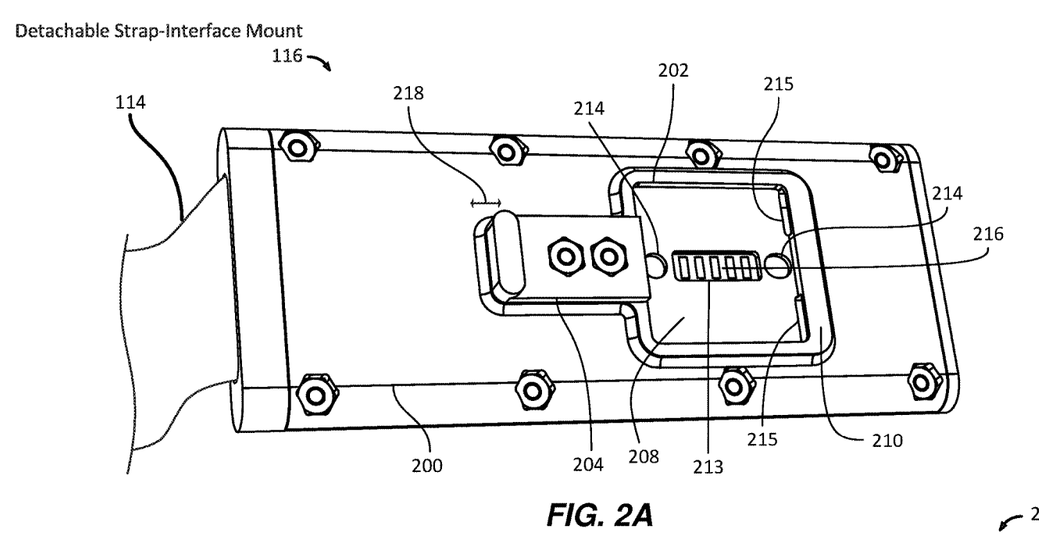
FIG. 2A is a perspective view of an exemplary detachable strap-interface mount.

FIG. 2A is a perspective view of an inner mounting surface 200 of a detachable strap-interface mount 116 in accordance with some embodiments. In some examples, inner mounting surface 200 may include an interface 202 and a latch 204. Interface 202 may be shaped to mateably and demateably engage an opposing strap interface of head-mounted display 102 (e.g., interface 302 illustrated in FIG. 3). In general, interface 202 may be configured as one half of a pair of mating physical interfaces that detachably couple detachable strap-interface mount 116 to interface 302 of head-mounted display 102. In some embodiments, as shown in FIG. 2A, interface 202 may be configured as a rectangular receptacle with a planar base 208. In some examples, interface 202 may be recessed within inner mounting surface 200. Additionally or alternatively, interface 202 may be defined by a surrounding raised perimeter 210.

Figure 2B:
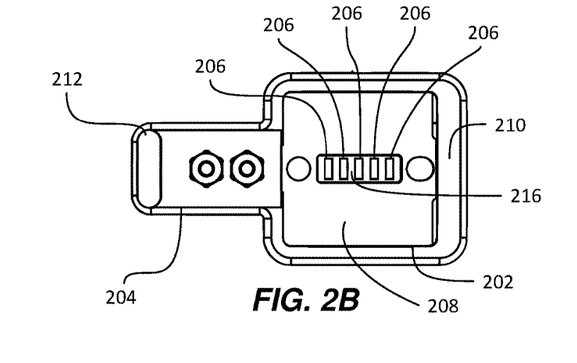
FIG. 2B is a front view of the interface illustrated in FIG. 2A.

Planar base 208 may include various recesses that perform various functions. For example, planar base 208 may include circular alignment recesses 214 that may be configured to mate with circular alignment protrusions of interface 302 of head-mounted display 102 (e.g., alignment protrusions 312 illustrated in FIG. 3) that properly align opposing interface 302 within interface 202. Planar base 208 may also include an electrical-connection recess 213 that includes electrical contact pads 206 as illustrated in FIG. 2B. Planar base 208 may also include interface-retaining recesses 215. As shown, interface-retaining recesses 215 may be configured as grooves that accept retention tongues (e.g., retention tongues 308 of interface 302 illustrated in FIG. 3B) of interface 302 and that retain one side of interface 302 within interface 202.

Figure 9A:
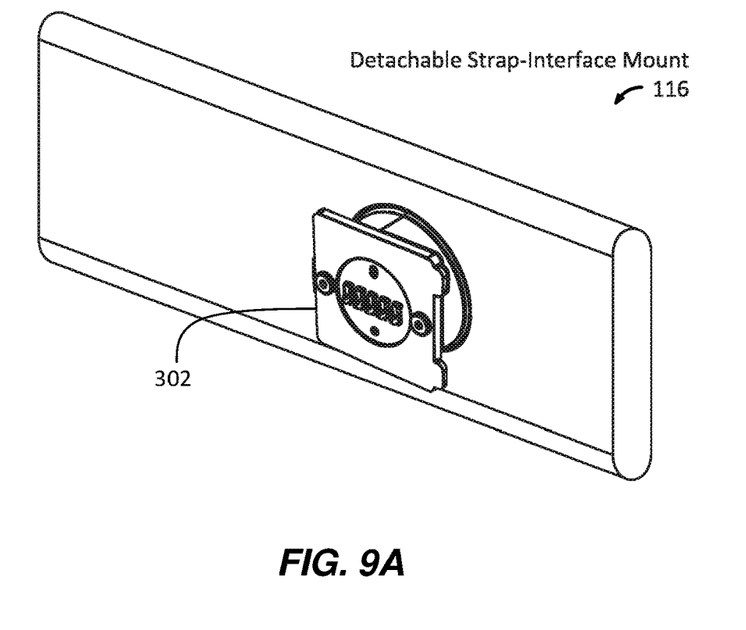
FIG. 9A is a perspective view of another exemplary detachable strap-interface mount.

While FIG. 2A illustrates interface 202 as a rectangular receptacle, detachable strap-interface mount 116 may have an interface that is configured in any other suitable shape (e.g., a circular shape). Additionally, detachable strap-interface mount 116 may have an interface that is configured as either a protruding (i.e., male) interface that may be inserted into a matching recessed (i.e., female) interface or a recessed interface that may accept a matching protruding interface. FIG. 9A illustrates an alternative configuration of an interface of detachable strap-interface mount 116. In this example, detachable strap-interface mount 116 may include interface 302.

FIG. 2B is a front view of interface 202 illustrated in FIG. 2A according to some embodiments. As shown, interface 202 may include an electrical-connection element 216 integrated into planar base 208. Electrical-connection element 216 may be configured as a ribbon cable with integrated electrical connectors. As shown in FIG. 2B, electrical-connection element 216 may include electrical contact pads 206. Electrical contact pads 206 may be flat contact pads or surfaces that are evenly arranged. In some examples, electrical contact pads 206 may be configured to carry electrical power, an audio signal, a video signal, a sensor signal, or a control signal to one or more electrical accessories of a head-mounted-display strap system. In some examples, electrical contact pads 206 may be configured to blind-mate to opposing spring connectors (e.g., spring connectors 306 in FIG. 3B) of head-mounted display 102.

As shown in FIGS. 2A and 2B, latch 204 may be coupled to detachable strap-interface mount 116 and may be configured to retain, in a retaining orientation (e.g., the orientation illustrated in FIG. 7A), interface 302 of head-mounted display 102 against interface 202 such that electrical contact pads 206 maintain contact with electrical connectors 306 of interface 302. Latch 204 may also be configured to travel by a distance 218 to a releasing orientation (e.g., the orientation illustrated in FIGS. 7B and 7C) that enables interface 302 of head-mounted display 102 to be decoupled from interface 202 such that electrical contact pads 206 are no longer connected to electrical connectors 306. In some examples, latch 204 may include a graspable protrusion 212 that enables a user to apply a lateral force to latch 204 to move latch 204 from its retaining orientation to its releasing orientation.

Figure 2C:
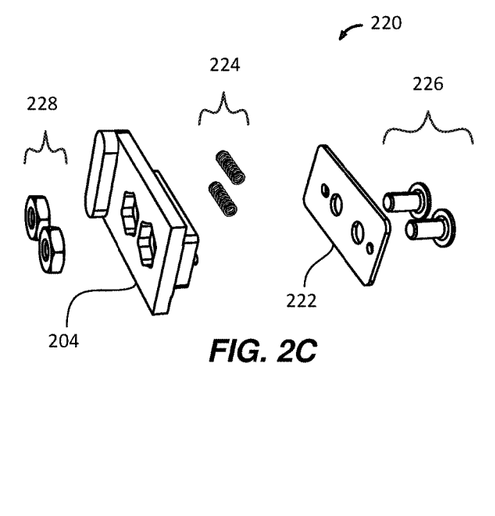
FIG. 2C is an exploded view of the latch illustrated in FIGS. 2A and 2B.

FIG. 2C is an exploded view of a latch retention mechanism 220 that may couple latch 204 to detachable strap-interface mount 116 in accordance with some embodiments. Latch retention mechanism 220 may enable latch 204 to be positioned in (1) a retaining orientation (e.g., retaining orientation 700 illustrated in FIG. 7A) and (2) a releasing orientation (e.g., releasing orientation 702 illustrated in FIG. 7B) relative to detachable strap-interface mount 116 and interface 202. As shown, latch retention mechanism 220 may include latch 204, a retention plate 222, springs 224, bolts 226, and nuts 228. Retention plate 222 may couple latch 204 to detachable strap-interface mount 116 when latch 204 is positioned on the front-side of inner mounting surface 200, retention plate 222 is positioned on the back-side of inner mounting surface 200, and retention plate 222 is coupled to latch 204 with bolts 226 and nuts 228. In this example, springs 224 may provide a restoring force to latch 204 that restores latch 204 to its retaining orientation.

FIG. 3A is a perspective view of head-mounted display 102 in accordance with some embodiments. As shown, head-mounted display 102 may include outer housing 104 with an integrated interface 302 for interfacing with an opposing interface of a detachable-strap system (e.g., interface 202 of detachable strap-interface mount 116 as illustrated in FIG. 2A). Interface 302 may be shaped to mateably and demateably engage interface 202. In general, interface 302 may be configured as one half of a pair of mating physical interfaces that detachably couple head-mounted display 102 to detachable strap system 110.

Figure 9B:
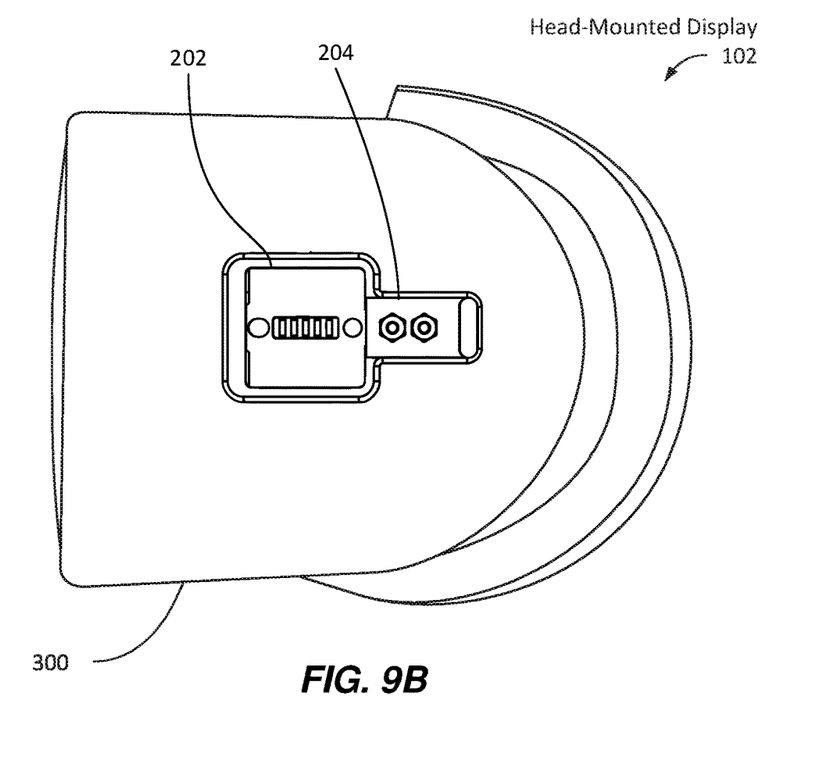
FIG. 9B is a perspective view of another exemplary head-mounted display with an interface.

In some examples, as shown in FIG. 3A, interface 302 may be configured as a rectangular male plug that extends from outer housing 104. While FIG. 3A illustrates interface 302 as a rectangular male plug, interface 302 may be configured in any other suitable shape (e.g., a circular or irregular shape). Additionally, interface 302 may be configured as a protruding (i.e., male) interface that may be inserted into a matching recessed (i.e., female) interface or a recessed interface that may accept a matching protruding interface. FIG. 9B illustrates an alternative configuration of an interface of head-mounted display 102. In this example, head-mounted display 102 may include interface 202 and latch 204.

Figure 3B:
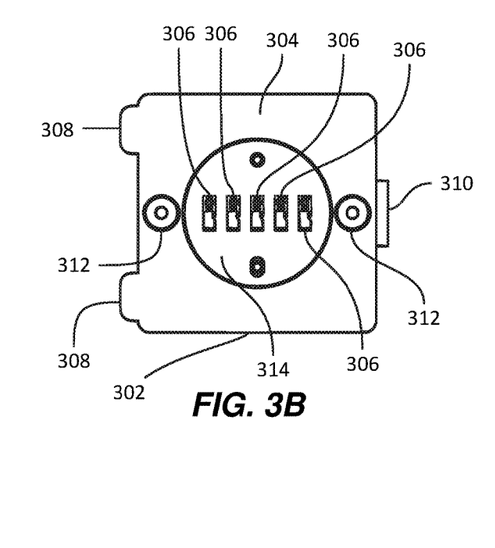
FIG. 3B is a front view of the interface illustrated in FIG. 3A.

As shown in FIG. 3B, in some embodiments, interface 302 may include a face surface 304 that includes electrical connectors 306. In general, electrical connectors 306 may be any electrical connector that may be blind-mated with opposing electrical connectors of a detachable strap system. In some examples, electrical connectors 306 may be spring-loaded connectors, spring-loaded pins, spring probes, or pogo pins that may make an electrical connection when contacting another conductive surface. Electrical connectors 306 may provide, when in contact with opposing electrical connectors of a detachable strap system, an electrical connection from electronic accessories of the detachable strap system to electrical components contained in outer housing 104. As shown in FIG. 3B, electrical connectors 306 may be coupled to an electrical-connection element 314 (e.g., a printed circuit board) that is coupled to interface 302.

Interface 302 may include various elements that enable interface 302 to be retained within or against an opposing interface of a detachable strap system. For example, as shown in FIG. 3B, interface 302 may include retention tongues 308 that may be configured to slide into retention grooves of an opposing interface of a detachable strap system (e.g., interface-retaining recesses 215 illustrated in FIG. 2A). Interface 302 may also include a retention tongue 310. In some examples, retention tongue 310 may be a contact point by which a latch of a detachable strap system retains interface 302.

In some examples, outer housing 104 and interface 302 may be configured as a single seamless element. Alternatively, interface 302 may be incorporated into a mounting element that may be coupled to outer housing 104. FIG. 4A shows a perspective view of a mounting element 400 coupled to interface 302 that may be coupled to outer housing 104 in accordance with some embodiments. As illustrated, mounting element 400 may include an outer surface 402 in which holes 404 are integrally formed that enable mounting element 400 to be affixed to outer housing 104 with suitable fasteners (e.g., suitable screws). In some examples, interface 302 and mounting element 400 may be configured as a single seamless element. Alternatively, interface 302 may be configured as a detachable interface that may be mateably and demateably coupled to mounting element 400 (as shown in FIG. 4B).

FIG. 4B shows an exploded view of mounting element 400 and interface 302 according to some embodiments. As illustrated, mounting element 400 may include an integrated interface 406 for coupling interface 302 to mounting element 400. Interface 406 may be shaped to mateably and demateably engage a proximal end 408 of interface 302. In general, interface 406 may be configured as one half of a pair of mating physical interfaces that couple interface 302 to mounting element 400. In some examples, as shown in FIG. 4B, interface 406 may be configured as a cylindrical female port that is formed into mounting element 400. In this example, a retention clip 410 may be clipped on proximal end 408 of interface 302 to retain interface 302 within interface 406. As shown in FIG. 4B, interface 302 may include a recess 411 within which electrical-connection element 314 may be mounted within face surface 304. In this example, interface 302 may include connection elements 412 that connect electrical-connection element 314 to wires 414 and electrical connector 416 that may provide a physical electrical pathway from electrical connectors 306 to various electrical components of head-mounted display 102.

Figure 7A:
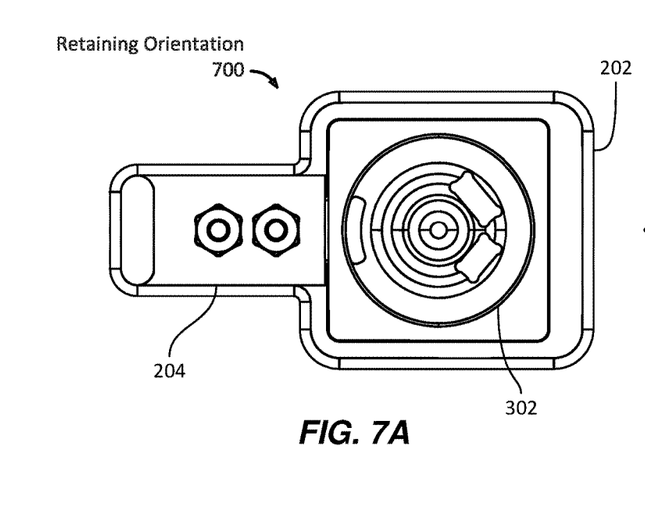
FIG. 7A is a view of a latch in an exemplary retaining orientation that couples an interface of a strap system to an interface of a head-mounted display.
Figure 7B:
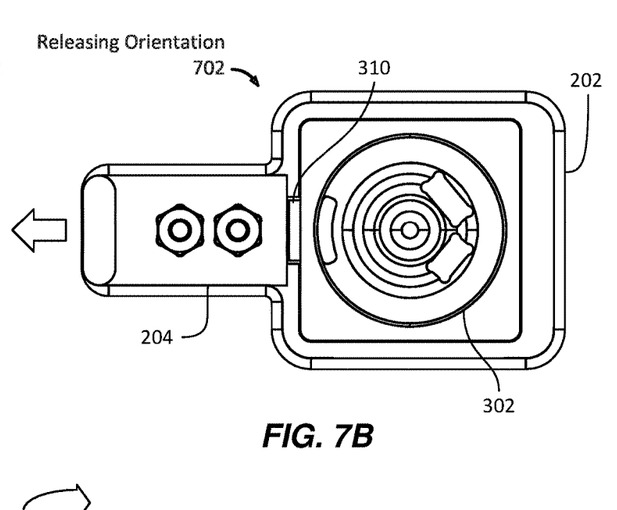
FIG. 7B is a view of a latch in an exemplary releasing orientation that enables an interface of a strap system and an interface of a head-mounted display to be decoupled.

FIGS. 5-6 are simplified top views of head-mounted-display system 100. In these figures, detachable strap system 110 includes two instances of detachable strap-interface mounts 116 which are referenced here as 116(A) and 116(B). As shown in FIG. 5, detachable strap-interface mount 116(A) may be coupled to a right-side lower strap 114 of detachable strap system 110. Similarly, detachable strap-interface mount 116(B) may be coupled to a left-side lower strap 114 of detachable strap system 110. FIG. 5 illustrates head-mounted-display system 100 when each of detachable strap-interface mounts 116(A) and 116(B) are attached to head-mounted display 102. In this example, latch 204 of each of detachable strap-interface mounts 116(A) and 116(B) may be in its retaining orientation 700 as illustrated in FIG. 7A. A user may have attached detachable strap-interface mounts 116(A) and 116(B) to head-mounted display 102 by retracting latch 204 of each of detachable strap-interface mounts 116(A) and 116(B) to releasing orientation 702 as illustrated in FIG. 7B and by inserting interface 302 of the right and left sides of head-mounted display 102 into interface 202 of each of detachable strap-interface mounts 116(A) and 116(B).

Figure 7C:
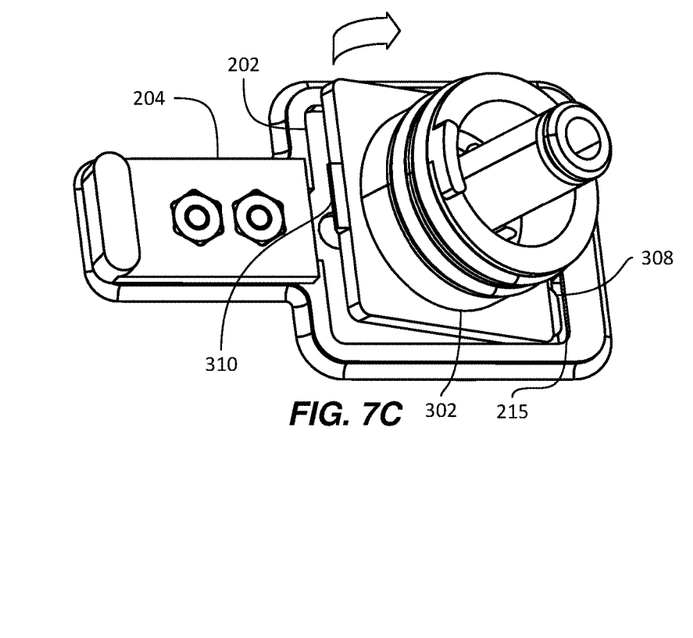
FIG. 7C is a perspective view of an exemplary decoupling of an interface of a strap system from an interface of a head-mounted display.

FIG. 6 illustrates head-mounted-display system 100 when each of detachable strap-interface mounts 116(A) and 116(B) have been detached from head-mounted display 102. In this example, detachable strap-interface mounts 116(A) and 116(B) may have each been previously attached to head-mounted display 102 (as shown in FIG. 5) and latch 204 of each of detachable strap-interface mounts 116(A) and 116(B) may have started in its retaining orientation 700 as illustrated in FIG. 7A. A user may have detached detachable strap-interface mounts 116(A) and 116(B) from head-mounted display 102 by retracting latch 204 of each of detachable strap-interface mounts 116(A) and 116(B) to releasing orientation 702 as illustrated in FIG. 7B and by rotating interfaces 302 of head-mounted display 102 out of interfaces 202 of detachable strap-interface mounts 116(A) and 116(B) as shown in FIG. 7C.

Figure 8:
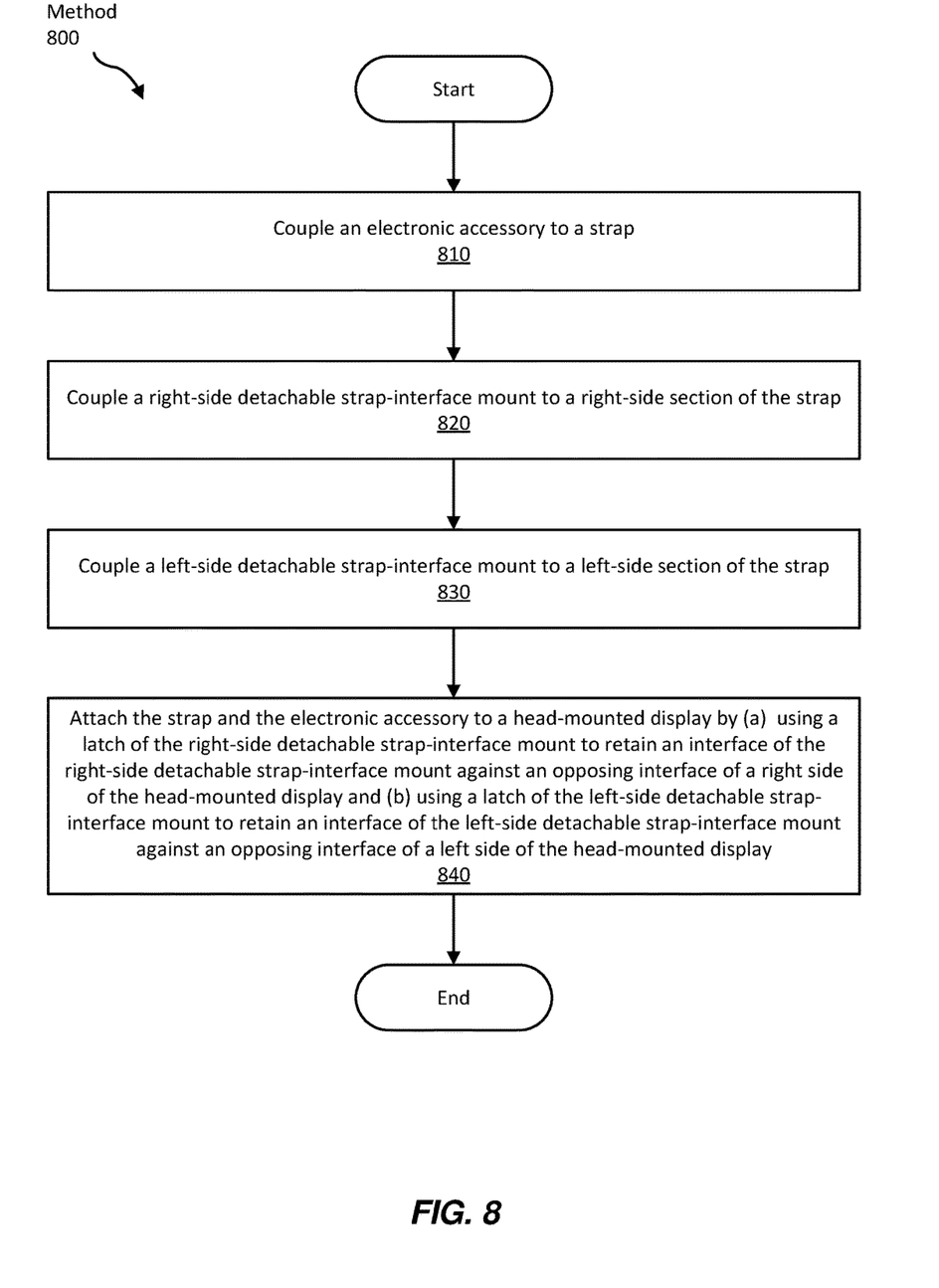
FIG. 8 is a flow diagram of an exemplary method for assembling a head-mounted-display system with a detachable strap system.

FIG. 8 shows, by way of example, a method for manufacturing, assembling, using, adjusting, or otherwise configuring or creating the systems and devices presented herein. In particular, FIG. 8 illustrates a flow diagram of a method 800 for assembling a detachable strap system and then attaching the detachable strap system to a head-mounted display. As shown in FIG. 8, at step 810 an electronic accessory may be coupled to a strap. Using FIG. 1 as an example, lights 120 may be affixed to back piece 118, cable 122 may be integrated into left-side lower strap 114, and/or audio subsystems 130 may be attached or affixed to lower straps 114.

At step 820, a right-side detachable strap-interface mount may be coupled to a right-side section of the strap. Using FIG. 5 as an example, detachable strap-interface mount 116(A) may be coupled to right-side lower strap 114. At step 830, a left-side detachable strap-interface mount may be coupled to a left-side section of the strap. Using FIG. 5 as an example, detachable strap-interface mount 116(B) may be coupled to left-side lower strap 114.

At step 840, the strap and the electronic accessory may be attached to a head-mounted display by (a) using a latch of the right-side detachable strap-interface mount to retain an interface of the right-side detachable strap-interface mount against an opposing interface of a right-side of the head-mounted display and (b) using a latch of the left-side detachable strap-interface mount to retain an interface of the left-side detachable strap-interface mount against an opposing interface of a left-side of the head-mounted display. For example, detachable strap system 110 may be attached to head-mounted display 102 by (a) using latch 204 of detachable strap-interface mount 116(A) to retain interface 302 of the right side of head-mounted display 102 in interface 202 of detachable strap-interface mount 116(A) and by (b) using latch 204 of detachable strap-interface mount 116(B) to retain interface 302 of the left side of head-mounted display 102 in interface 202 of detachable strap-interface mount 116(B).

The process parameters and sequence of the steps described and/or illustrated in FIG. 8 are given by way of example only and can be varied as desired. For example, while the steps illustrated and/or described herein may be shown or discussed in a particular order, these steps do not necessarily need to be performed in the order illustrated or discussed to assemble, manufacture, or use a head-mounted-display system with a detachable strap system. The various exemplary methods described and/or illustrated in FIG. 8 may also omit one or more of the steps described or illustrated herein or include additional steps in addition to those disclosed.

As discussed throughout the instant disclosure, the disclosed methods, systems, and devices may provide one or more advantages over traditional head-mounted-display systems with traditional strap systems. For example, the detachable strap systems described herein may enable electronic accessories that need a physical electronic connection to a head-mounted display to be incorporated into a strap system that can easily be attached to and removed from the head-mounted display. In this way, users of the disclosed head-mounted-display systems with detachable strap systems may replace dirty or worn straps systems and/or swap out generic strap systems with strap systems that better suit their needs.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, thereby enabling others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various embodiments described herein is for the purpose of explaining particular embodiments only and is not intended to be limiting. As used in the discussion of the various highlighted embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A detachable head-mounted-display strap-interface apparatus comprising:
    a strap comprising an electrical accessory that necessitates an electrical connection to a head-mounted display;
    a mount coupled to the strap, the mount comprising:
        an interface that is mateable and demateable to an opposing interface of the head-mounted display;
        an electrical connector that is configured to provide the electrical connection from the electrical accessory to the head-mounted display when contacting an opposing electrical connector of the head-mounted display; and
        a latch that:
            couples, in a first orientation, the interface and the opposing interface of the head-mounted display such that:
                the electrical connector and the opposing electrical connector maintain contact; and
                the strap holds the head-mounted display against a user's face; and
            enables, in a second orientation, the interface to be decoupled from the opposing interface of the head-mounted display and the electrical connector to be disconnected from the opposing electrical connector.

2. The detachable head-mounted-display strap-interface apparatus of claim 1, wherein:
    the opposing interface of the head-mounted display comprises a mateable and demateable plug;
    the interface comprises a receptacle that is configured to receive the plug of the head-mounted display; and
    the latch is configured to:
        retain, in the first orientation, the plug of the head-mounted display in the receptacle such that:
            the electrical connector and the opposing electrical connector maintain contact; and
            the strap holds the head-mounted display against a user's face; and
        enable, in the second orientation, the plug of the head-mounted display to be decoupled from the receptacle and the electrical connector to be disconnected from the opposing electrical connector.

3. The detachable head-mounted-display strap-interface apparatus of claim 2, wherein:
    the receptacle comprises a planar base; and
    the electrical connector is integral to the planar base.

4. The detachable head-mounted-display strap-interface apparatus of claim 3, wherein the electrical connector is further recessed into the planar base.

5. The detachable head-mounted-display strap-interface apparatus of claim 1, wherein the mount comprises four additional electrical connectors that are configured to provide additional electrical connections to the head-mounted display when contacting four additional opposing electrical connectors of the head-mounted display.

6. The detachable head-mounted-display strap-interface apparatus of claim 1, wherein:
    the opposing electrical connector comprises a spring connector; and
    the electrical connector comprises a contact pad configured to blind-mate to the spring connector.

7. The detachable head-mounted-display strap-interface apparatus of claim 1, wherein the electrical accessory comprises a light-emitting motion-tracking accessory.

8. The detachable head-mounted-display strap-interface apparatus of claim 1, wherein the electrical connector is configured to carry at least one of:
    electrical power;
    an audio signal;
    a video signal;
    a sensor signal; or
    a control signal.

9. The detachable head-mounted-display strap-interface apparatus of claim 1, wherein the electrical accessory comprises at least one of:
    a motion-tracking accessory;
    an audio accessory; or
    a cable.

10. A head-mounted-display strap-interface apparatus comprising:
    a head-mounted display;
    a mount coupled to the head-mounted display, the mount comprising:
        an interface that is mateable and demateable to an opposing interface of a strap, the strap comprising an electrical accessory that necessitates an electrical connection to the head-mounted display;
        an electrical connector that is configured to provide the electrical connection from the electrical accessory to the head-mounted display when contacting an opposing electrical connector of the strap; and
        a latch that:
            couples, in a first orientation, the interface and the opposing interface of the strap such that:
                the electrical connector and the opposing electrical connector maintain contact; and
                the strap holds the head-mounted display against a user's face; and
            enables, in a second orientation, the interface to be decoupled from the opposing interface of the strap and the electrical connector to be disconnected from the opposing electrical connector.

11. The head-mounted-display strap-interface apparatus of claim 10, wherein:

the opposing interface of the strap comprises a mateable and demateable plug;
the interface comprises a receptacle that is configured to receive the plug of the strap; and
the latch is configured to:
retain, in the first orientation, the plug of the strap in the receptacle such that:
the electrical connector and the opposing electrical connector maintain contact; and
the strap holds the head-mounted display against a user's face; and
enable, in the second orientation, the plug of the strap to be decoupled from the receptacle and the electrical connector to be disconnected from the opposing electrical connector.

12. A head-mounted-display system comprising:
a head-mounted display;
a strap comprising an electrical accessory that necessitates an electrical connection to the head-mounted display;
a mount coupled to the head-mounted display, the mount comprising:
an interface that is mateable and demateable to an opposing interface of the strap; and
an electrical connector that is configured to provide the electrical connection from the electrical accessory to the head-mounted display when contacting an opposing electrical connector of the strap; and
an opposing mount coupled to the strap, the opposing mount comprising:
the opposing interface that is mateable and demateable to the interface of the head-mounted display;
the opposing electrical connector that is configured to provide the electrical connection from the electrical accessory to the head-mounted display when contacting the electrical connector of the head-mounted display; and
a latch that:
couples, in a first orientation, the interface and the opposing interface such that:
the electrical connector and the opposing electrical connector maintain contact; and
the strap holds the head-mounted display against a user's face; and
enables, in a second orientation, the interface to be decoupled from the opposing interface and the electrical connector to be disconnected from the opposing electrical connector.

13. The head-mounted-display system of claim 12, wherein:
the interface of the head-mounted display comprises a mateable and demateable plug;
the opposing interface of the strap comprises a receptacle that is configured to receive the plug of the head-mounted display; and the latch is configured to:
retain, in the first orientation, the plug of the head-mounted display in the receptacle of the strap such that:
the electrical connector and the opposing electrical connector maintain contact; and
the strap holds the head-mounted display against the user's face; and
enable, in the second orientation, the plug of the head-mounted display to be decoupled from the receptacle of the strap and the electrical connector to be disconnected from the opposing electrical connector.

14. The head-mounted-display system of claim 13, wherein:
the receptacle comprises a planar base that is recessed into the opposing mount; and
the opposing electrical connector is integral to the planar base.

15. The head-mounted-display system of claim 14, wherein the opposing electrical connector is further recessed into the planar base.

16. The head-mounted-display system of claim 12, wherein:
the mount comprises four additional electrical connectors that are configured to provide additional electrical connections to the head-mounted display when contacting four additional opposing electrical connectors of the strap; and
the opposing mount comprises the four additional opposing electrical connectors.

17. The head-mounted-display system of claim 12, wherein:
the electrical connector comprises a spring connector; and
the opposing electrical connector comprises a contact pad configured to blind-mate to the spring connector.

18. The head-mounted-display system of claim 12, wherein the electrical accessory comprises a light-emitting motion-tracking accessory.

19. The head-mounted-display system of claim 12, wherein the electrical connector and the opposing electrical connector are configured to carry at least one of:
electrical power;
an audio signal;
a video signal;
a sensor signal; or
a control signal.

20. The head-mounted-display system of claim 12, wherein the electrical accessory comprises at least one of:
a motion-tracking accessory;
an audio accessory; or
a cable.

* * * * *

UNITED STATES PATENT AND TRADEMARK OFFICE
CERTIFICATE OF CORRECTION

PATENT NO. : 10,146,262 B1
APPLICATION NO. : 15/581804
DATED : December 4, 2018
INVENTOR(S) : Lesley Ribble Magrath et al.

Page 1 of 1

It is certified that error appears in the above-identified patent and that said Letters Patent is hereby corrected as shown below:

On the Title Page

Item [54] and in the Specification, Column 1, Line 2, delete "DETATCHABLE" and insert -- DETACHABLE --, therefor.

Signed and Sealed this
Fifth Day of March, 2019

Andrei Iancu
*Director of the United States Patent and Trademark Office*